(12) United States Patent
Yamamura et al.

(10) Patent No.: US 7,695,671 B2
(45) Date of Patent: Apr. 13, 2010

(54) METHOD FOR MANUFACTURING A HONEYCOMB STRUCTURED BODY

(75) Inventors: Norihiko Yamamura, Gifu (JP); Syuhei Hayakawa, Gifu (JP); Yoshiteru Ohira, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 146 days.

(21) Appl. No.: 11/695,246

(22) Filed: Apr. 2, 2007

(65) Prior Publication Data
US 2007/0262497 A1    Nov. 15, 2007

Related U.S. Application Data

(63) Continuation of application No. PCT/JP2006/308238, filed on Apr. 19, 2006.

(51) Int. Cl.
*B28B 1/00* (2006.01)
*F26B 3/02* (2006.01)

(52) U.S. Cl. .................. 264/630; 264/677; 34/438; 34/439

(58) Field of Classification Search ................ 264/630, 264/631, 677; 34/438, 439
See application file for complete search history.

(56) References Cited

U.S. PATENT DOCUMENTS

| | | | |
|---|---|---|---|
| 1,613,042 A * | 1/1927 | Lykken | .................. 34/66 |
| 5,914,187 A | 6/1999 | Naruse et al. | |
| 6,165,936 A * | 12/2000 | Yamada et al. | .............. 502/439 |
| 6,669,751 B1 | 12/2003 | Ohno et al. | |
| 7,112,233 B2 | 9/2006 | Ohno et al. | |
| 7,309,370 B2 | 12/2007 | Kudo et al. | |
| 7,332,014 B2 | 2/2008 | Ono et al. | |
| 7,341,614 B2 | 3/2008 | Hayashi et al. | |
| 7,348,049 B2 | 3/2008 | Yoshida | |
| 7,387,829 B2 | 6/2008 | Ohno et al. | |
| 7,393,376 B2 | 7/2008 | Taoka et al. | |

(Continued)

FOREIGN PATENT DOCUMENTS

EP    1659105    5/2006

(Continued)

OTHER PUBLICATIONS

European search report on EP 07003758.5, dated Jun. 15, 2007.

*Primary Examiner*—Steven P Griffin
*Assistant Examiner*—Erin Snelting
(74) *Attorney, Agent, or Firm*—Ditthavong Mori & Steiner, P.C.

(57) ABSTRACT

A method for manufacturing a honeycomb structured body including molding ceramic raw material to form a pillar-shaped honeycomb molded body having a multiplicity of cells disposed in parallel with one another in the longitudinal direction with a cell wall therebetween, and filling in either one of the end portions of each of the cells with a plug material paste, and firing the honeycomb molded body to manufacture a honeycomb structured body comprising a honeycomb fired body, wherein after having filled in either one of the end portions of each of the cells of the honeycomb molded body with the plug material paste, a plug material paste drying process to dry the plug material paste is conducted by blowing hot air to an end face of the honeycomb molded body using a hot air drying apparatus.

18 Claims, 8 Drawing Sheets

U.S. PATENT DOCUMENTS

| | | |
|---|---|---|
| 7,396,586 B2 | 7/2008 | Ohno et al. |
| 7,427,308 B2 | 9/2008 | Taoka et al. |
| 7,427,309 B2 | 9/2008 | Ohno et al. |
| 7,438,967 B2 | 10/2008 | Fujita |
| 7,449,427 B2 | 11/2008 | Ohno et al. |
| 7,462,216 B2 | 12/2008 | Kunieda et al. |
| 7,473,465 B2 | 1/2009 | Ohno et al. |
| 2004/0161596 A1 | 8/2004 | Taoka et al. |
| 2004/0206062 A1* | 10/2004 | Ichikawa .................... 55/523 |
| 2005/0109023 A1 | 5/2005 | Kudo et al. |
| 2005/0153099 A1 | 7/2005 | Yamada |
| 2005/0169819 A1 | 8/2005 | Shibata |
| 2005/0175514 A1 | 8/2005 | Ohno |
| 2005/0180898 A1 | 8/2005 | Yamada |
| 2005/0247038 A1 | 11/2005 | Takahashi |
| 2005/0272602 A1 | 12/2005 | Ninomiya |
| 2006/0029769 A1* | 2/2006 | Ichikawa et al. ............ 428/116 |
| 2006/0029897 A1 | 2/2006 | Saijo et al. |
| 2006/0029898 A1 | 2/2006 | Saijo et al. |
| 2006/0043562 A1 | 3/2006 | Watanabe |
| 2006/0051556 A1 | 3/2006 | Ohno et al. |
| 2006/0073970 A1 | 4/2006 | Yamada |
| 2006/0108347 A1 | 5/2006 | Koyama et al. |
| 2006/0118546 A1 | 6/2006 | Saijo |
| 2006/0150598 A1 | 7/2006 | Ichikawa et al. |
| 2006/0166820 A1 | 7/2006 | Ogyu et al. |
| 2006/0210765 A1 | 9/2006 | Ohno et al. |
| 2006/0216466 A1 | 9/2006 | Yoshida |
| 2006/0216467 A1 | 9/2006 | Yoshida |
| 2006/0222812 A1 | 10/2006 | Koyama et al. |
| 2006/0225390 A1 | 10/2006 | Yoshida |
| 2006/0230732 A1 | 10/2006 | Kunieda |
| 2006/0245465 A1 | 11/2006 | Saijo et al. |
| 2006/0269722 A1 | 11/2006 | Yamada |
| 2006/0283039 A1* | 12/2006 | Ishii et al. .................... 34/282 |
| 2007/0020155 A1 | 1/2007 | Ohno et al. |
| 2007/0028575 A1 | 2/2007 | Ohno et al. |
| 2007/0044444 A1 | 3/2007 | Oshimi |
| 2007/0068128 A1 | 3/2007 | Oshimi et al. |
| 2007/0085233 A1 | 4/2007 | Yamada |
| 2007/0116908 A1 | 5/2007 | Ohno et al. |
| 2007/0126160 A1 | 6/2007 | Takahashi |
| 2007/0128405 A1 | 6/2007 | Sakaguchi et al. |
| 2007/0130897 A1 | 6/2007 | Sakaguchi et al. |
| 2007/0169453 A1 | 7/2007 | Hayakawa |
| 2007/0175060 A1 | 8/2007 | Idei et al. |
| 2007/0178275 A1 | 8/2007 | Takahashi |
| 2007/0190350 A1 | 8/2007 | Ohno et al. |
| 2007/0196620 A1 | 8/2007 | Ohno et al. |
| 2007/0199205 A1 | 8/2007 | Hoshino et al. |
| 2007/0204580 A1 | 9/2007 | Kunieda |
| 2007/0212517 A1 | 9/2007 | Ohno et al. |
| 2007/0235895 A1 | 10/2007 | Yamamura et al. |
| 2007/0243283 A1 | 10/2007 | Yamamura et al. |
| 2007/0262498 A1 | 11/2007 | Saijo et al. |
| 2007/0293392 A1 | 12/2007 | Ohno et al. |
| 2008/0067725 A1 | 3/2008 | Naruse et al. |
| 2008/0084010 A1 | 4/2008 | Naruse et al. |
| 2008/0088072 A1 | 4/2008 | Kobayashi |
| 2008/0106008 A1 | 5/2008 | Kasai et al. |
| 2008/0106009 A1 | 5/2008 | Naruse et al. |
| 2008/0116200 A1 | 5/2008 | Kawai et al. |
| 2008/0120950 A1 | 5/2008 | Ohno et al. |
| 2008/0136053 A1 | 6/2008 | Kuribayashi et al. |
| 2008/0136062 A1 | 6/2008 | Kasai et al. |
| 2008/0138567 A1 | 6/2008 | Ninomiya et al. |
| 2008/0157445 A1 | 7/2008 | Kawai et al. |
| 2008/0174039 A1 | 7/2008 | Saijo et al. |
| 2008/0190081 A1 | 8/2008 | Oshimi |
| 2008/0190083 A1 | 8/2008 | Oshimi |
| 2008/0197544 A1 | 8/2008 | Saijo et al. |
| 2008/0213485 A1 | 9/2008 | Shibata |
| 2008/0236115 A1 | 10/2008 | Sakashita |
| 2008/0236122 A1 | 10/2008 | Ito |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0241444 A1 | 10/2008 | Oshimi |
| 2008/0241466 A1 | 10/2008 | Saito et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| JP | 2000-044326 | 2/2000 |
| JP | 2005-131800 | 5/2005 |
| WO | WO 2004-085029 | 10/2004 |

* cited by examiner

A-A line cross-sectional view

D-D line cross-sectional view

METHOD FOR MANUFACTURING A HONEYCOMB STRUCTURED BODY

CROSS-REFERENCE TO RELATED APPLICATIONS

This application claims priority of PCT/JP2006/308238 field on Apr. 19, 2006. The contents of this application are incorporated herein by reference in their entirety.

BACKGROUND OF THE INVENTION

1. Field of the Invention

The present invention relates to a method for manufacturing a honeycomb structured body.

2. Discussion of the Background

Particulates such as soot and the like contained in the exhaust gas expelled by the internal combustion engines of vehicles such as busses, trucks and the like, and construction equipment, have become a problem of recent, in that they cause harm to the environment and the human body. To remedy this, there are currently being proposed numerous kinds of honeycomb filters using a honeycomb structured body of porous ceramic as a filter for capturing particulates contained in exhaust gasses, and thus purifying the exhaust gas.

Conventionally, when manufacturing a honeycomb structured body, for example, first, a ceramic powder, a binder, and a liquid dispersal medium are combined to prepare a wet mixture. Then, this wet mixture is further mixed using a screw mixer and the like, and furthermore, the wet mixture is continuously extrusion-molded with a die, and the extruded molded body is then cut to a prescribed length to manufacture a rectangular pillar-shaped honeycomb molded body.

Next, the honeycomb molded body attained above is dried using a microwave drying apparatus or a hot air drying apparatus to thereby (for example, see JP-A 2000-44326, JP-A 2005-131800) manufacture a dried honeycomb molded body having a consistent degree of strength and easy handleability.

After this drying process, a plug material paste layer is formed by filling in either one of the end portions of each of the cells of the honeycomb molded body with the plug material paste to achieve a sealed state of the cells. After the sealed state has been achieved, degreasing and firing treatment is carried out thereto, thus manufacturing the honeycomb fired body.

After this, a sealing material paste is applied onto the sides of the honeycomb fired bodies, and the honeycomb fired bodies are adhered together using a sealing material paste. This state of a multitude of honeycomb fired bodies being bonded by interposing a sealing material layer (adhesive layer) effectuates an aggregated body of honeycomb fired bodies. A cutting process is then carried out on the achieved aggregate body of honeycomb fired bodies using a cutting machine or the like to form a ceramic block of a prescribed form, such as a cylindrical form, a cylindroid form, and the like. Finally, a sealing material paste is applied over the outer periphery of the ceramic block to form a sealing material layer (coat layer), thus completing the manufacturing of the honeycomb structured body.

The contents of JP-A 2000-44326 and JP-A 2005-131800 are incorporated herein by reference in their entirety.

SUMMARY OF THE INVENTION

According to one aspect of the present invention, a method for manufacturing a honeycomb structured body of the present invention includes molding ceramic raw material to form a pillar-shaped honeycomb molded body having a multiplicity of cells disposed in parallel with one another in the longitudinal direction with a cell wall therebetween, and filling in either one of the end portions of each of the cells with a plug material paste, and firing this honeycomb molded body to manufacture a honeycomb structured body including a honeycomb fired body, wherein after having filled in either one of the end portions of each of the cells of the honeycomb molded body with the plug material paste, a plug material paste drying process to dry the plug material paste is conducted by blowing hot air to an end faces of the honeycomb molded body using a hot air drying apparatus.

BRIEF DESCRIPTION OF THE DRAWINGS

FIG. 2-1A is a plan view schematically showing the interior portion of a hot air drying apparatus used in a plug material paste drying process of the method for manufacturing a honeycomb structured body according to the embodiment of the present invention, and FIG. 2-1B is a cross-sectional view taken on line B-B of FIG. 2-1A.

FIG. 2-2A is a plan view schematically showing the interior portion of another hot air drying apparatus used in a plug material paste drying process of the method for manufacturing a honeycomb structured body according to the embodiment of the present invention, and FIG. 2-2B is a cross-sectional view taken on line C-C of FIG. 2-2A.

DESCRIPTION OF THE EMBODIMENTS

Figure 1A:
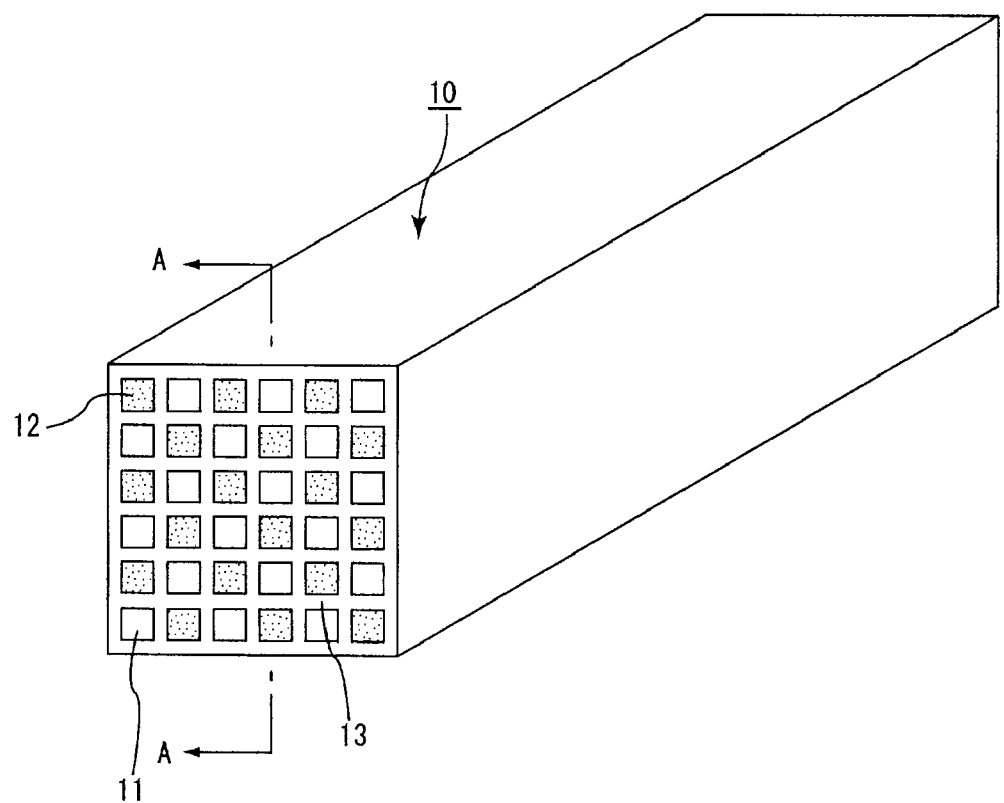
FIG. 1A is a perspective view schematically showing a honeycomb molded body according to one embodiment of the present invention, in which either one of the end portions of each of the cells thereof is filled in with plug material paste.

The method for manufacturing a honeycomb structured body according to one embodiment of the present invention comprises molding ceramic raw material to form a pillar-shaped honeycomb molded body having a multiplicity of cells disposed in parallel with one another in the longitudinal direction with a cell wall therebetween, and filling in either one of the end portions of each of the cells with a plug material paste, and firing this honeycomb molded body to manufacture a honeycomb structured body comprising a honeycomb fired body, wherein after having filled in either one of the end portions of each of the cells of the honeycomb molded body with the plug material paste, a plug material paste drying process to dry the plug material paste is conducted by blowing hot air to one end face of the honeycomb molded body using a hot air drying apparatus.

In manufacturing of the conventional honeycomb structured body, a plug material layer recess (shrinkage) is thought to be caused by shrinkage of the plug material paste layer during the processes of degreasing and firing the honeycomb molded body, with the method for manufacturing the honeycomb structured body according to the embodiment of the present invention, however, since the surface (both end portions) of this plug material paste layer is preferentially dried after having filled in either one of the end portions of each of the cells with the plug material paste to form the plug material paste layer, it becomes easier to lower the fluidity of the plug material paste layer, and as it becomes difficult to form a recess (shrinkage) or the like, it becomes easier to manufacture a honeycomb structured body having cells in which one end portion is assuredly sealed with a plug material layer of a desired shape.

And in the present specification, the term 'end face' of the honeycomb molded body refers to faces at which cells are exposed among the faces forming the exterior shape of the honeycomb molded body, while the term 'side face' refers to all faces that are not end faces.

Also, in the present specification, with respect to 'to blow hot air', the actions of blowing hot air onto, blasting hot air to, sending hot air to, and like actions of blowing hot air are collectively rendered as 'to blow hot air'. The above mentioned term 'hot air', representing moving heated air, is generally used largely to refer to air heated to a degree able to evaporate moisture and effectuate drying, and in the present invention, the term 'hot air' refers to a gas at a temperature of about 70° C. or more.

Here, first description will be set forth in regard to the above mentioned plug material paste drying process, and afterward, description will be set forth in regard to the full manufacturing process of the manufacturing method according to the embodiment of the present invention.

In the above mentioned plug material paste drying process, the above mentioned plug material paste is dried by blowing hot air to an end face of the honeycomb molded body on which either one of the end portions of each of the cells has been filled in with the plug material paste.

Figure 1B:
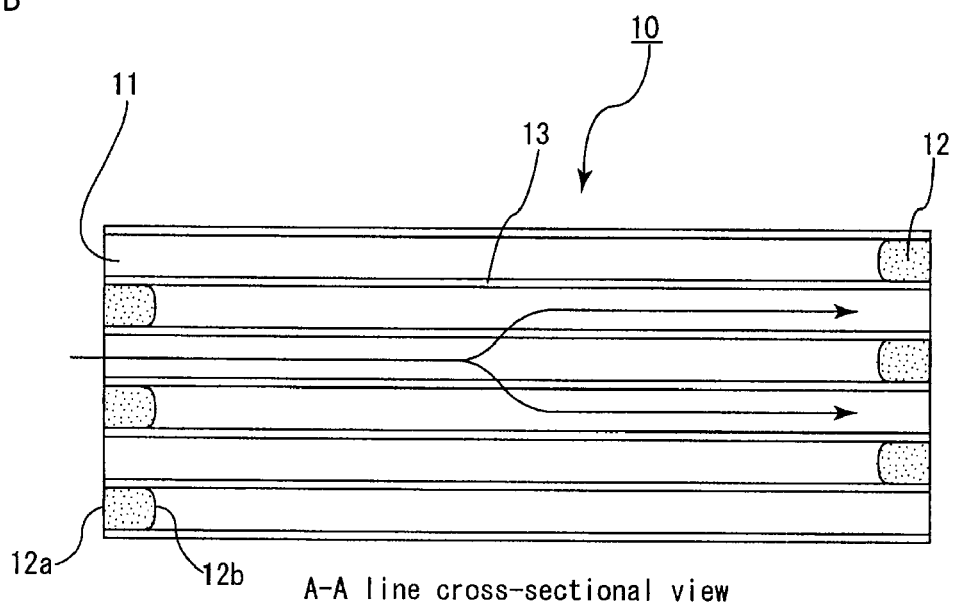
FIG. 1B is a cross-sectional view taken on line A-A of FIG. 1A.

In the present process, a honeycomb molded body such as the one shown in FIGS. 1A and 1B, filled in with plug material and having a plug material paste layer formed on either one of the end portions of each of the cells, will serve as the drying subject. FIG. 1A is a perspective view schematically showing a honeycomb molded body in which either one of the end portions of each of the cells is filled in with the plug material paste while FIG. 1B is a cross-sectional view taken on line A-A of FIG. 1A.

As shown in FIGS. 1A and 1B, a honeycomb molded body 10 filled in with a plug material paste is a pillar-shaped honeycomb molded body having a multiplicity of cells 11 disposed in parallel with one another in the longitudinal direction with cell walls 13 therebetween, and forming a plug material paste layer 12 on either one of the end portions of each of the cells.

Also, FIGS. 1A and 1B shows a rectangular pillar-shaped honeycomb molded body, but the exterior shape of the honeycomb molded body serving as the drying subject or the shape of the cells are not particularly limited.

Therefore, it is acceptable that the exterior shape of the above mentioned honeycomb molded body be a rectangular pillar shape, a cylindrical pillar shape, or a pillar-shaped body of any other shape.

Also, it is acceptable for each of the above mentioned cells to have any cross-sectional shape, and each of the cells may have different shapes or the same shape.

In the above mentioned plug material paste drying process, the plug material paste is dried using a hot air drying apparatus. As long as the above mentioned drying apparatus is one able to blow hot air to the end face of a honeycomb molded body having plug material paste filled thereto, it is not particularly limited. However, it is preferable that the hot air drying apparatus be one comprising a transport member for transporting the honeycomb molded body and hot air blow ports inside the drying oven, and be formed in a manner in which these hot air blow ports are disposed at a position facing the end face of the above mentioned honeycomb molded body, and hot air is blown from the above mentioned hot air blow ports.

Figures 1A, 2:
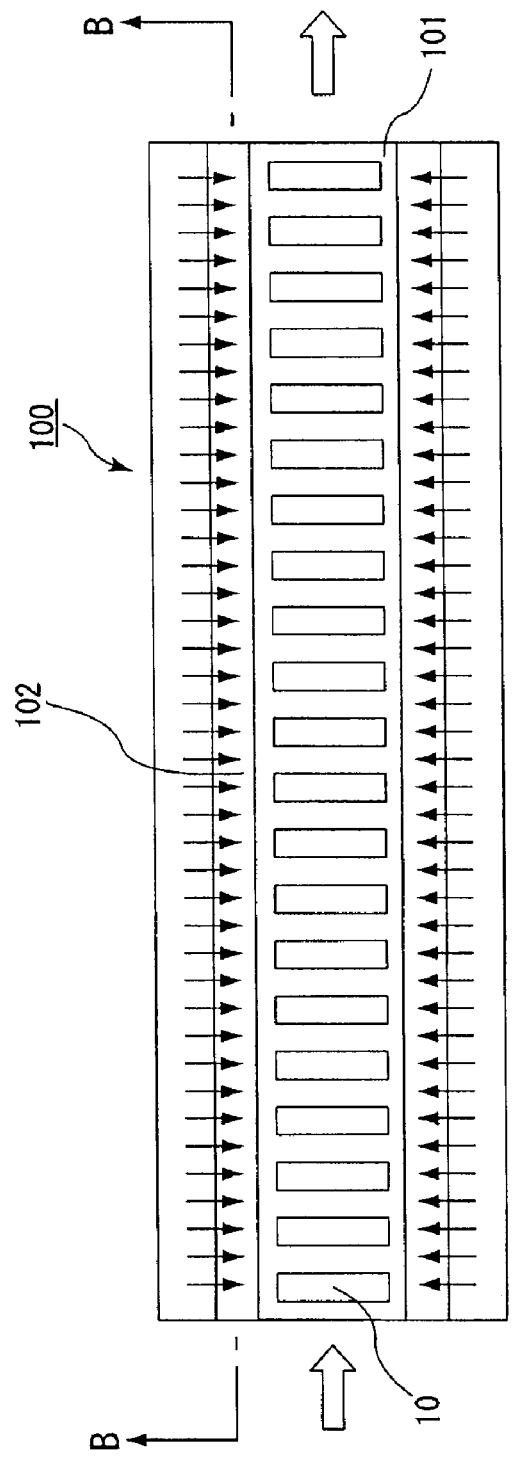
Figures 1B, 2:
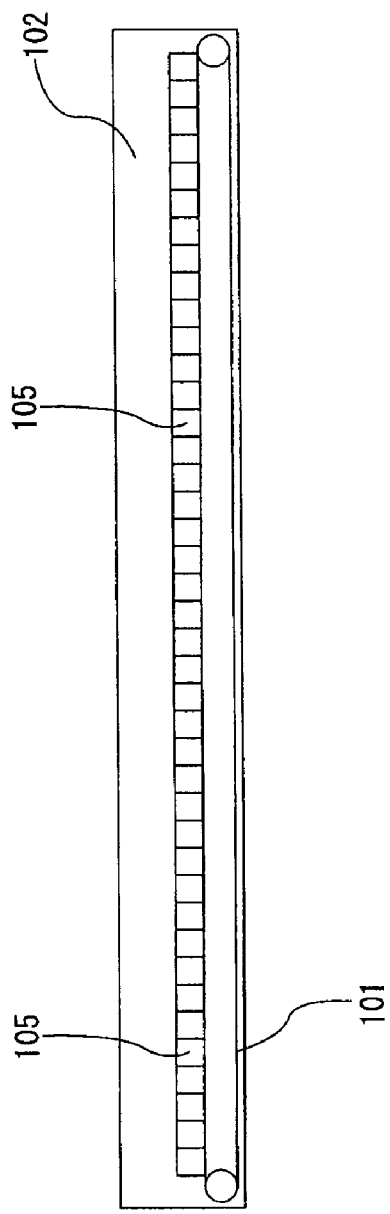

With regard to a hot air drying apparatus having this kind of structure, for example, a hot air drying apparatus according to the embodiment shown in FIGS. 2-1A and 2-1B or the like can be used.

FIG. 2-1A is a plan view schematically showing the inside of the hot air drying apparatus used in the plug material paste drying process of the method for manufacturing the honeycomb structured body according to the embodiment of the present invention, and FIG. 2-1B is a cross-sectional view taken on line B-B of FIG. 2-1A.

In a hot air drying apparatus 100 shown in FIGS. 2-1A and 2-1B, there is disposed a belt conveyer 101 that functions as a transport member on a floor portion of a drying oven 102. A honeycomb molded body 10 is placed on top of the belt conveyer 101 in a manner in which the longitudinal direction perpendicularly faces the direction of movement, the same honeycomb molded body 10 is carried into the interior portion of the hot air drying apparatus 100 through an inlet, and after having moved for a prescribed amount of time inside the hot air drying apparatus 100, is carried out of the hot air drying apparatus 100 through an outlet. The movement of the belt conveyer 101 is set so as to be executed at a constant speed.

Also, in this hot air drying apparatus 100, hot air blow ports 105 are disposed inside the drying oven 102 in parallel with one another at a position facing the end faces of the honeycomb molded body 10 and on both sides of the belt conveyer 101 spanning over approximately the entire range from the inlet side to the outlet side.

And the plug material paste is dried by blowing hot air from the hot air blow port 105 to the honeycomb molded body 10.

More specifically, following the movement of the belt conveyer 101, the honeycomb molded body 10 placed on the belt conveyer 101 moves through the interior portion of the hot air drying apparatus 100, where the plug material paste layer formed onto the end portion of each of the cells of the honeycomb molded body 10 is dried by the hot air blown from both sides of the conveyer belt.

The hot air drying apparatus 100 shown in FIGS. 2-1A and 2-1B has a structure able to blow hot air to both end faces of the honeycomb molded body 10 simultaneously.

By blowing hot air to both end faces of the honeycomb molded body 10 simultaneously, both end portions 12a and 12b (refer to FIGS. 1A and 1B) of a plug material paste layer 12 formed onto the end portion of each of the cells of the honeycomb molded body are dried preferentially, and even if the interior of the plug material paste layer has fluidity at the initial stage of drying, both end portions of the plug material paste layer are made hardened.

Thus, it becomes difficult to form recesses (shrinkage) in the plug material paste layer when drying of the plug material paste layer progresses further or when degreasing and firing are carried out on the honeycomb molded body in the subsequent processes, and it becomes easier to conduct drying, degreasing, and firing to a desired shape.

In the above mentioned plug material paste drying process, it is acceptable to blow hot air to both end faces of the honeycomb molded body 10 simultaneously, and it is also acceptable to blow air to either one side of the honeycomb molded body 10 alternately. However, in a case of blowing hot air to either one side of the honeycomb molded body 10 alternately, since it takes time for the side that receives hot air in the last half of the process to dry, there is a risk that recesses (shrinkage) will form on the surface thereof. For this reason, it is preferable to conduct the blowing of hot air to both end faces simultaneously.

Figures 2, 2A:
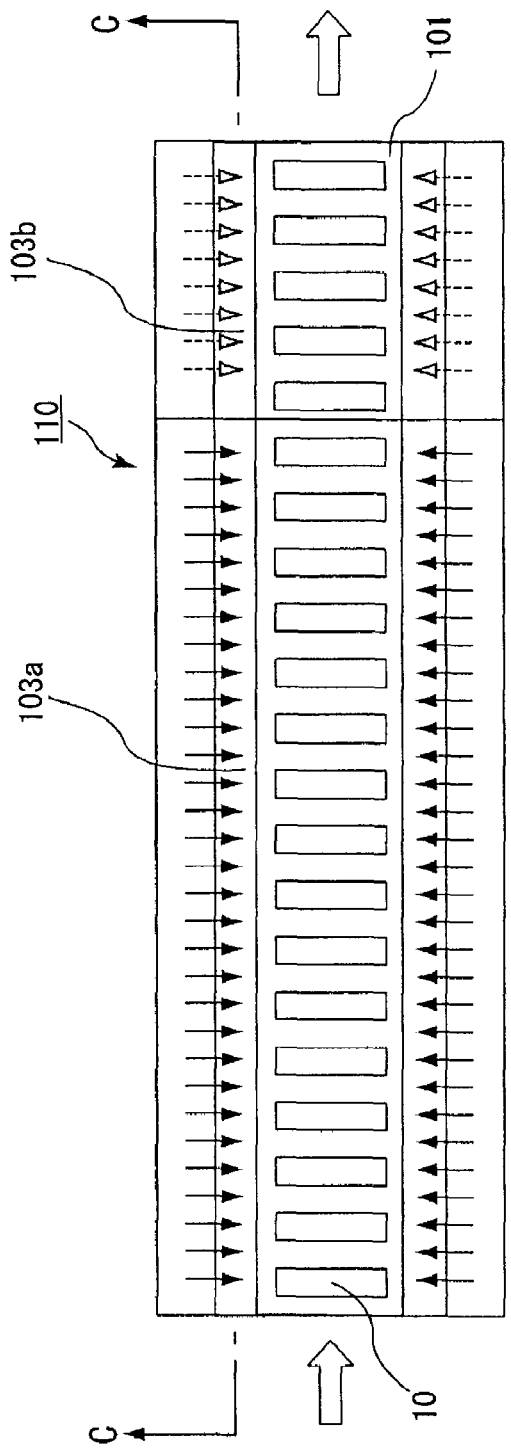
Figures 2, 2B:
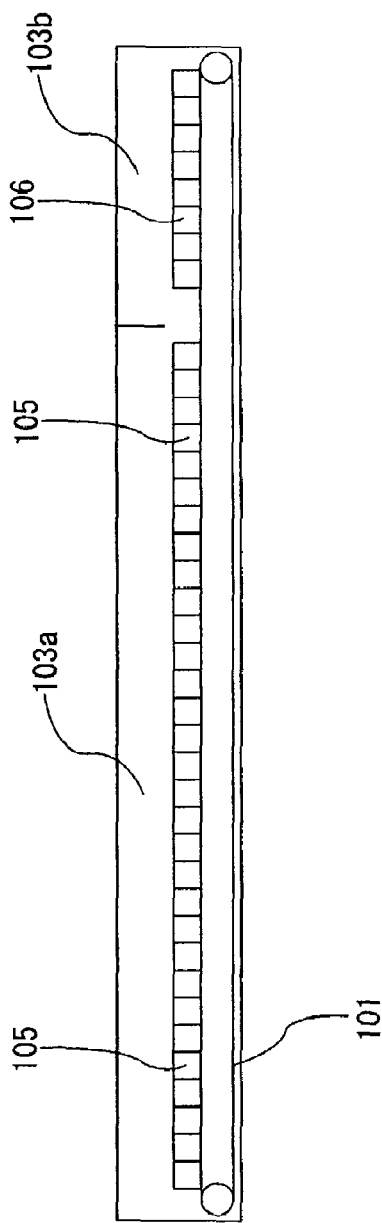

Also, the hot air drying apparatus used in the method for manufacturing a honeycomb structured body according to the embodiment of the present invention may include a drying oven that has a drying portion and a cooling portion of the kind shown in FIGS. 2-2A and 2-2B.

FIG. 2-2A is a plan view schematically showing the interior portion of another hot air drying apparatus used in the plug material paste drying process of the method for manufacturing a honeycomb structured body according to the embodiment of the present invention, and FIG. 2-2B is a cross-sectional view taken on line C-C of FIG. 2-2A.

A hot air drying apparatus 110 shown in FIGS. 2-2A and 2-2 B, when compared to the hot air drying apparatus 100 shown in FIGS. 2-1A and 2-1B, further comprises a cooling portion inside the drying oven on the outlet side.

More specifically, the hot air drying apparatus 110 is configured in such a manner that the belt conveyer 101 functioning as the transport member on the floor of a drying oven having a drying portion 103a and a cooling portion 103b is disposed, and that the honeycomb molded body 10 is carried out from the outlet of the hot air drying apparatus after the honeycomb molded body 10 placed on top of the belt conveyer 101 in a manner in which the longitudinal direction perpendicularly faces the direction of movement has passed through the drying portion 103a and the cooling portion 103b in a prescribed period of time.

Here, in the drying portion 103a, in the same manner as in the drying oven 102 forming the hot air drying apparatus 100, hot air blow ports 105 are disposed inside the drying oven in parallel with one another at a position facing the end faces of the honeycomb molded body 10 on both sides of the belt conveyer 101 spanning over approximately the entire range from the inlet side to the outlet side.

Also, aside from the point of being formed in such a manner as to allow blowing cold air instead of hot air, the structure of the cooling portion 103b is same as that of the drying portion 103a, as the cooling portion 103b disposes cold air blow ports 106 inside the drying oven in parallel with one another at a position facing the end faces of the honeycomb molded body 10 on both sides of the belt conveyer 101 spanning over approximately the entire range from the inlet side to the outlet side.

In this manner, the use of the hot air drying apparatus comprising the cooling portion is preferable in light of the following point.

More specifically, since a honeycomb molded body that has just been blown with hot air undergoes a local temperature rise of the end face portion, in a case of transporting the honeycomb molded body in this state to the next process, inconveniences happen to the conveyer device, for example, deformation, deterioration, and the like, of the belt of the belt conveyer, and this is why it is preferable to include the cooling portion.

Also, in the above mentioned plug material paste drying process, it is preferable that the temperature of the hot air blown to the end faces of the honeycomb molded body be at least about 130° C. and at most about 210° C.

This is because if the hot air is at a temperature of about 130° C. or more, it becomes easier to dry the plug material paste sufficiently, and thus, it becomes difficult for the plug material paste layer to flow after drying, making it easier to form the plug material paste layer to a desired shape after the subsequent firing process is over. And alternately, if the hot air is at a temperature of about 210° C. or less, it becomes difficult for drying of the plug material paste to progress sharply, making it difficult to form recesses (shrinkage) or cracks in the plug material paste layer. And moreover, as progression of drying itself does not become excessive, degreasing of the plug material paste layer or the honeycomb molded body does not progress excessively, and it becomes difficult for portions in which degreasing has progressed to be brittle.

Also, it is preferable that the period of time over which the above mentioned hot air is blown be at least about 2 minutes and at most about 7 minutes.

This is because if the period of time over which the above mentioned hot air is blown is about 2 minutes or more, it becomes easier for the plug material paste to dry sufficiently, and thus it becomes difficult for the plug material paste to flow after drying, making it easier to form the plug material paste layer to a desired shape after the subsequent firing process is over. And alternately, the period of time over which the above mentioned hot air is blown is about 7 minutes or less, it becomes difficult for drying of the plug material paste to progress excessively, making it difficult to form recesses (shrinkage) or cracks in the plug material paste layer. And moreover, as progression of drying itself does not become excessive, degreasing of the plug material paste layer or the honeycomb molded body does not progress excessively, and it becomes difficult for portions in which degreasing has progressed become difficult to be brittle.

And in the present invention, the term 'period of time over which hot air is blown' in the above mentioned plug material paste drying process refers to the total time over which hot air is blown to the end faces of the honeycomb molded body. For example, in a case in which hot air blow ports are formed in parallel with one another spanning the entire range from the inlet side to the outlet side in a position facing the end faces of the honeycomb molded body, as is shown in FIGS. 2-1A and 2-1B, the amount of time spent passing through the interior of the drying oven is regarded as the amount of time spent blowing hot air thereto.

And in a case in which a cooling apparatus such as that shown in FIGS. 2-2A and 2-2B is included, the amount of time spent blowing cold air thereto is not included in the amount of time spent blowing hot air thereto.

Also, it is preferable that the wind speed at which the above mentioned hot air is blown be at least about 10 m/sec. and at most about 30 m/sec.

This is because if the above mentioned wind speed is about 10 m/sec or more, it becomes difficult for the plug material paste layer not to dry sufficiently, and alternately, if the wind speed of the above mentioned hot air is about 30 m/sec or less, as the wind speed is not too fast, it becomes difficult for the shape of the formed plug material paste layer to be deformed.

It is acceptable to appropriately select a movement speed for the above mentioned belt conveyer considering the size of the honeycomb molded body 10, and it is preferable that the movement speed of the above mentioned belt conveyer be at least about 0.4 m/min and at most about 1.0 m/min.

This is because if the movement speed of the above mentioned belt conveyer is about 0.4 m/min or more, the speed is not excessively slow and the honeycomb molded body does not stay in the hot air drying apparatus even after it has been sufficiently dried, thus making it easier to conduct drying in an efficient manner, and alternately, at a movement speed is about 1.0 m/min or less, it becomes easier for the plug material paste layer to dry sufficiently because the movement speed is not excessively fast.

Also, the hot air drying apparatuses 100, 110 shown in FIGS. 2-1A, 2-1B, 2-2A and 2-2B include a belt conveyer as a transport member for transporting the honeycomb molded body, but the transport member included by the hot air drying apparatus used in the manufacturing method of the present invention is not particularly limited to a belt conveyer, and it is also acceptable to use chain conveyers, roller conveyers, pallet conveyers, and the like.

Also, in the above mentioned hot air drying apparatus, it is acceptable for the transport member to move in a continuous manner, or an intermittent manner.

Also, in a case in which the transport member moves intermittently, it is acceptable for it to move always at a constant speed or move at a varying speed.

In the hot air drying apparatus shown in FIGS. 2-1A and 2-1 B, although the hot air blow ports are disposed over approximately the entire span from the inlet side to the outlet side of the drying oven, it is not necessarily essential that the above mentioned hot air blow ports be disposed over approximately the entire span from the inlet side to the outlet side in the hot air drying apparatus used in the manufacturing method according to the embodiment of the present invention, and it is also acceptable that adjacent hot air blow ports be disposed with intervals therebetween.

The same also goes for the drying portion of the hot air drying apparatus shown in FIGS. 2-2A and 2-2B. It is also acceptable to form adjacent cool air blow ports disposed in the cooling portion of the hot air drying apparatus shown in FIGS. 2-2A and 2-2B with intervals therebetween.

Next, the entire process of the method for manufacturing a honeycomb structured body according to the embodiment of the present invention, including this kind of plug material paste drying process, will be described in process order.

First, in the method for manufacturing a honeycomb structured body according to the embodiment of the present invention, the honeycomb structured body which is to be the subject of manufacture will be described.

Figure 3:
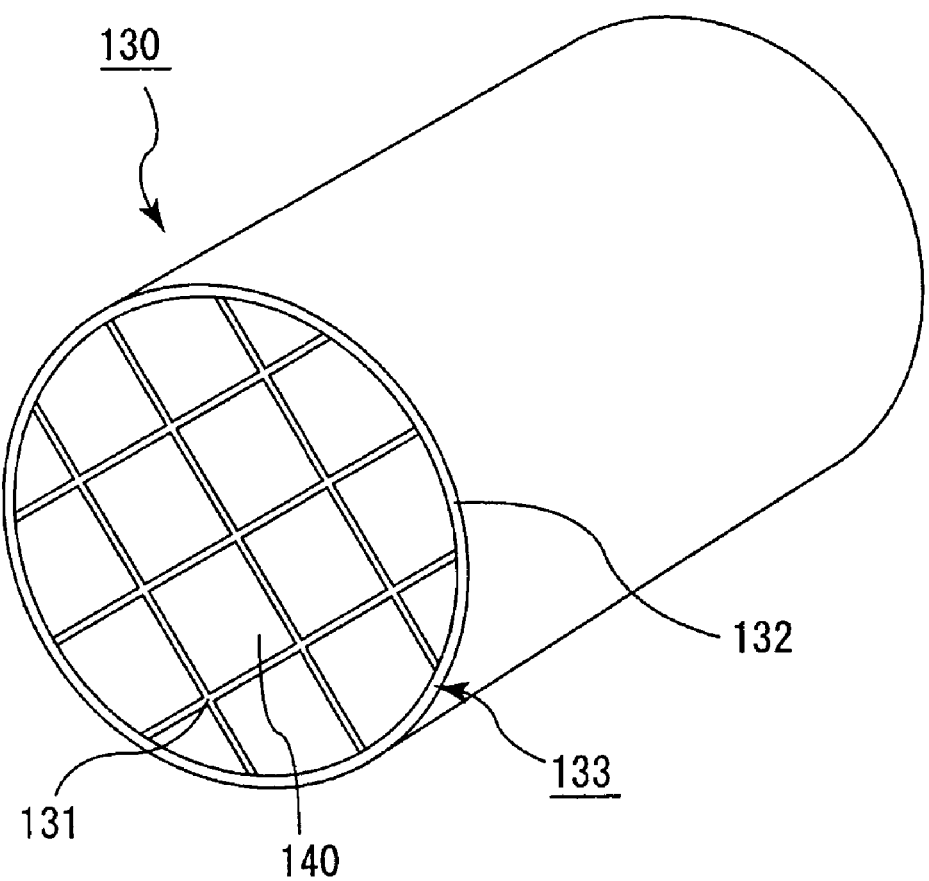
FIG. 3 is a perspective view schematically showing one example of a honeycomb structured body according to the embodiment of the present invention.
Figure 4A:
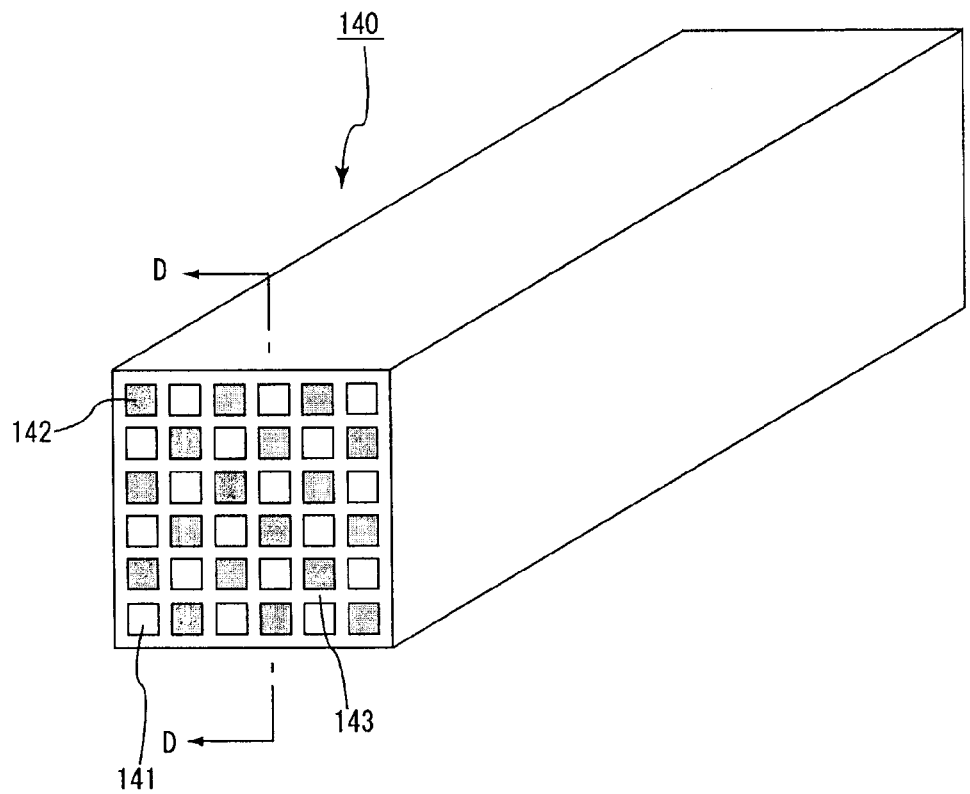
FIG. 4A is a perspective view schematically showing a honeycomb fired body forming the honeycomb structured body according to the embodiment of the present invention.

FIG. 3 is a perspective view schematically showing an example of a honeycomb structured body according to the embodiment of the present invention. FIG. 4A is a perspective view schematically showing a honeycomb fired body that comprises the above mentioned honeycomb structured body according to the embodiment of the present invention, while FIG. 4B is a cross-sectional view thereof, taken on line D-D of FIG. 4A.

In a honeycomb structured body 130 of this kind, a plurality of honeycomb fired bodies 140, of the kind shown in FIG. 3, are bound together by interposing a sealing material layer (adhesive layer) 131 forming a ceramic block 133, and a sealing material layer (coat layer) 132 is formed over the outer periphery of the ceramic block 133. Further, comprising the honeycomb fired body 140 are, as shown in FIGS. 4A and 4B, a multiplicity of cells 141 disposed in parallel with one another in the longitudinal direction, and cell walls 143, which partition the cells 141 individually, and provide filtration functionality.

Figure 4B:
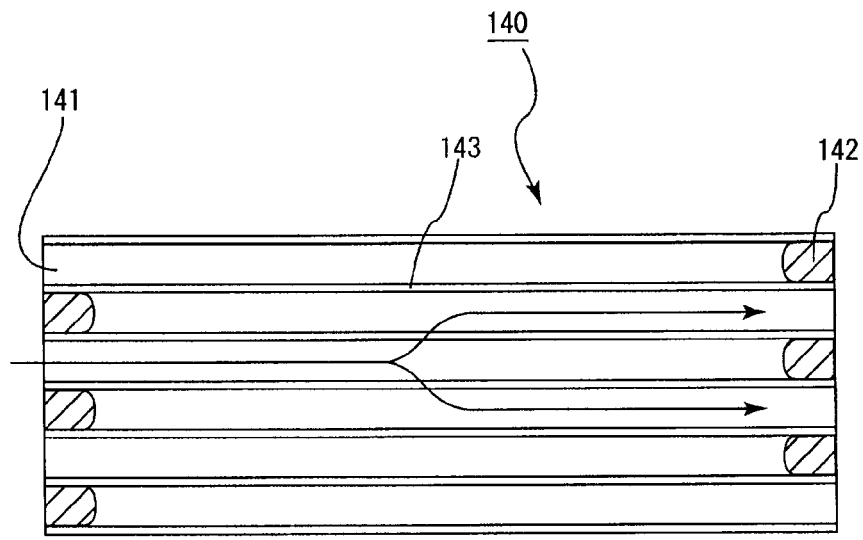
FIG. 4B is a cross-sectional view taken on line D-D of FIG. 4A.

Put it more plainly, as shown in FIG. 4B, the end portion on either the exhaust gas inlet side or the exhaust gas outlet side of the cells 141 formed in the honeycomb fired body 140 is sealed with a plug material layer 142. The exhaust gas which enters one cell 141 will always pass through the cell walls 143 with the cells 141 therebetween, to flow out through another one of the cells 141. When the exhaust gas passes through the cell wall 143, particulates contained within the exhaust gas are captured by the cell wall 143, thus purifying the exhaust gas.

In the description of the method for manufacturing a honeycomb structured body according to the embodiment of the present invention, description will be set forth regarding the method for manufacturing a honeycomb structured body according to the embodiment of the present invention using an example of a case of manufacturing a honeycomb structured body having silicon carbide as the main constituent of the material.

It is a matter of course that the main constituent of the material of the honeycomb structured body is not limited to silicon carbide. Other examples of ceramic raw material include for instance, components such as nitride ceramics such as aluminum nitride, silicon nitride, boron nitride, titanium nitride; carbide ceramics such as zirconium carbide, titanium carbide, tantalum carbide, tungsten carbide; and oxide ceramics such as alumina, zirconia, cordierite, mullite, and aluminum titanate, and the like.

From among these, non-oxide ceramics are desirable, and silicon carbide is particularly desirable. This is because they are excellent in thermal resistance properties, mechanical strength, thermal conductivity, and the like. Moreover, silicon-containing ceramic, which is obtained by blending metallic silicon with the ceramics set forth above, as well as ceramic bound by silicon or silicate compounds can also be used as the constituent material of the honeycomb structured body. And out of these, a component of silicon carbide blended with metallic silicon (silicon-containing silicon carbide) is preferable.

First, by dry-blending an organic binder with an inorganic powder such as silicon carbide powder having a different mean particle diameter as the ceramic raw material, the powder mixture is prepared, and a solution mixture is prepared of mixed liquid plasticizer, lubricating agent, and water. Next, the above mentioned powder mixture and the above mentioned solution mixture are further mixed together using a wet mixing machine, and thus a wet mixture for use in manufacturing the molded body is prepared.

Now, the particle diameter of the above mentioned silicon carbide powder is not particularly limited, but a particle diameter having little shrinkage during the subsequent firing process is preferable. For example, a mix of a powder having 100 by weight of particulate with a mean particle diameter at least about 0.3 μm and at most about 50 μm, and another powder having at least about 5 parts by weight and at most about 65 parts by weight particulate with a mean particle diameter at least about 0.1 μm and at most about 1.0 μm, is desirable.

It is necessary to adjust the temperature at which firing takes place in order to adjust the pore diameter and the like of the honeycomb molded body, and the pore diameter can also be adjusted by adjusting the particle diameter of the inorganic powder.

The above mentioned organic binder is not limited in particular and examples of binders include methylcellulose, carboxymethyl cellulose, hydroxyethyl cellulose, polyethylene glycol and the like. Of the binders mentioned above, methylcellulose is preferable.

It is preferable that the above mentioned binder be blended with the inorganic powder at a ratio at least about 1 part by weight and at most about 10 parts by weight of a binder per 100 parts by weight of an inorganic powder.

The above mentioned plasticizer is not limited in particular, and examples thereof include glycerin and the like.

The above mentioned lubricating agent is not limited in particular, and examples thereof include polyoxyalkylene compounds such as polyoxyethelyne alkyl ether and polyoxypropylene alkyl ether and the like.

Some specific examples of lubricating agents include polyoxyethelyn monobutyl ether, polyoxypropylene monobutyl ether and the like.

Also, in some cases, it is unnecessary to use a plasticizer or a lubricating agent in the mixed raw material powder.

Also, when preparing the above mentioned wet mixture, it is acceptable to use a diffusion medium such as water, organic solvents such as benzene and alcohol such as methanol and the like, for example. Further, it is also acceptable to add a molding agent to the above mentioned wet mixture.

The molding agent is not limited in particular, and examples thereof include ethylene glycol, dextrin, fatty acids, fatty acid soap, poly alcohol and the like.

Further, it is acceptable, according to need, to add a pore-forming agent such as balloon having oxide ceramics as a component therein, which is a micro hollow sphere, spherical acrylic particulate, or graphite, to the above mentioned wet mixture.

The above mentioned balloon is not particularly limited, and examples thereof include alumina balloons, glass micro balloons, shirasu balloons, fly ash balloons (FA balloons), mullite balloons and the like. Of the above mentioned, alumina balloon is preferable.

Also, it is preferable for the temperature of the above prepared wet mixture, which uses silicon carbide, to be about 28° C. or less. This is because if the temperature is about 28° C. or less, it becomes difficult for an organic binder to undergo gelatinization.

It is also preferable for the inorganic ratio of within the above mentioned wet mixture to be about 10% by weight or less, and it is also preferable for the moisture content weight of the wet mixture to be at least about 8.0% and at most about 20.0% by weight.

Next, the above mentioned wet mixture is carried into a molding machine, whereby a pillar-shaped honeycomb molded body of a multiplicity of cells disposed in parallel with one another in the longitudinal direction with a cell wall therebetween is manufactured by extrusion molding.

Afterward, according to necessity, the above mentioned honeycomb molded body is dried out using a drying apparatus such as a microwave drying apparatus, a hot air drying apparatus, a dielectric drying apparatus, a reduced pressure drying apparatus, a vacuum drying apparatus or a freeze drying apparatus.

Also, it is not necessarily required to conduct this drying process. It is for example also acceptable, instead of conducting a drying process after having manufactured the honeycomb molded body by extrusion molding, to conduct a process of filling in the honeycomb molded body with the plug material paste next, and to thereby dry the honeycomb molded body along with the drying of the plug material paste layer in the subsequent plug material paste drying process.

Next, either one of the end portions of each of the cells of the above mentioned honeycomb molded body is filled in with the plug material paste.

It is acceptable to fill it in with the above mentioned plug material paste using the honeycomb molded body cell plugging apparatus mentioned below or the like, for instance.

Figure 5:
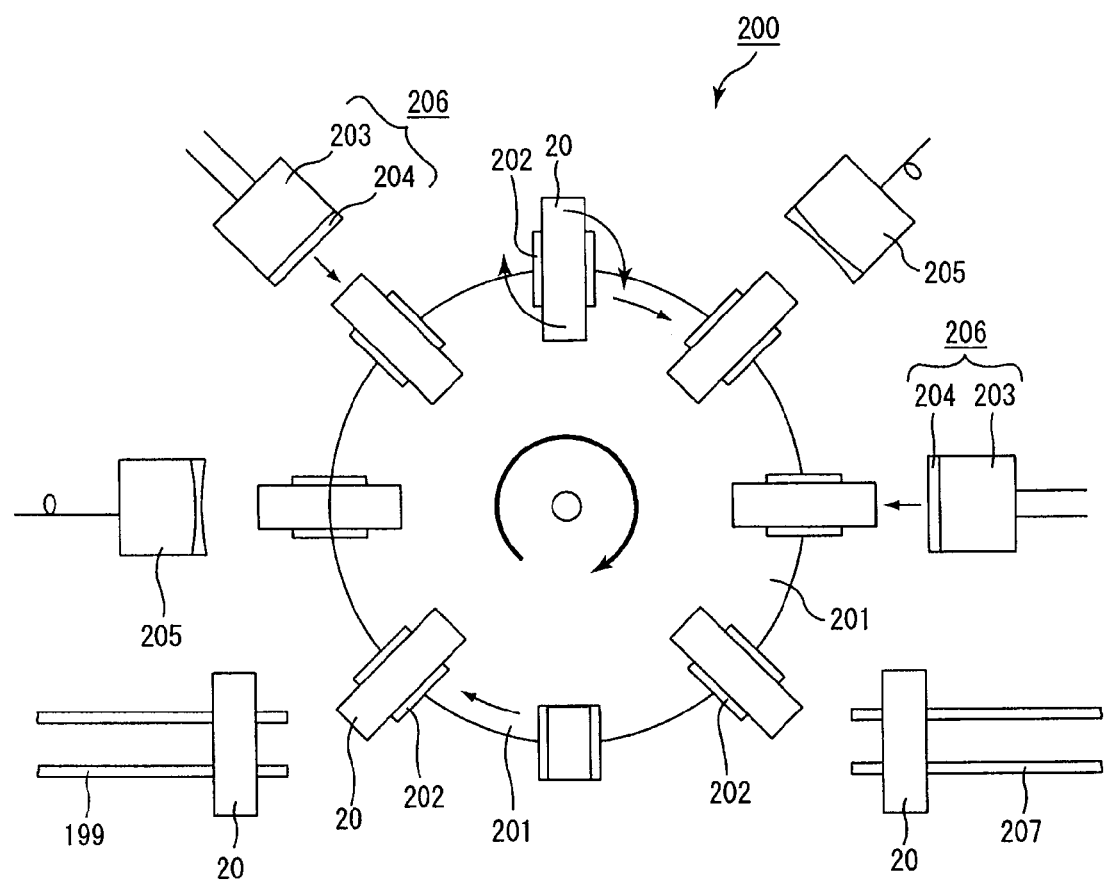
FIG. 5 is a conceptual view schematically showing a honeycomb molded body cell plugging apparatus according to the embodiment of the present invention.
Figure 6A:
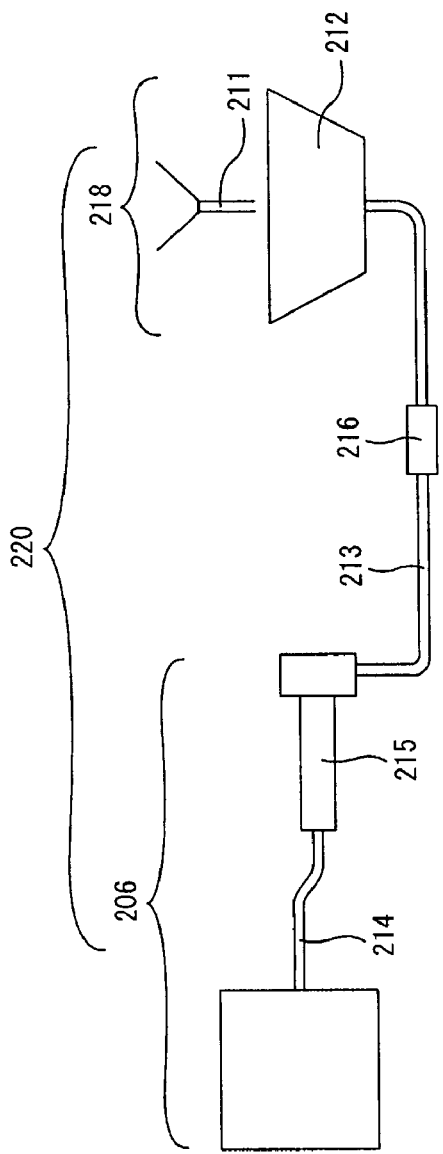
FIG. 6A is a view schematically showing a paste filling device forming the honeycomb molded body cell plugging apparatus according to the embodiment of the present invention.
Figure 6B:
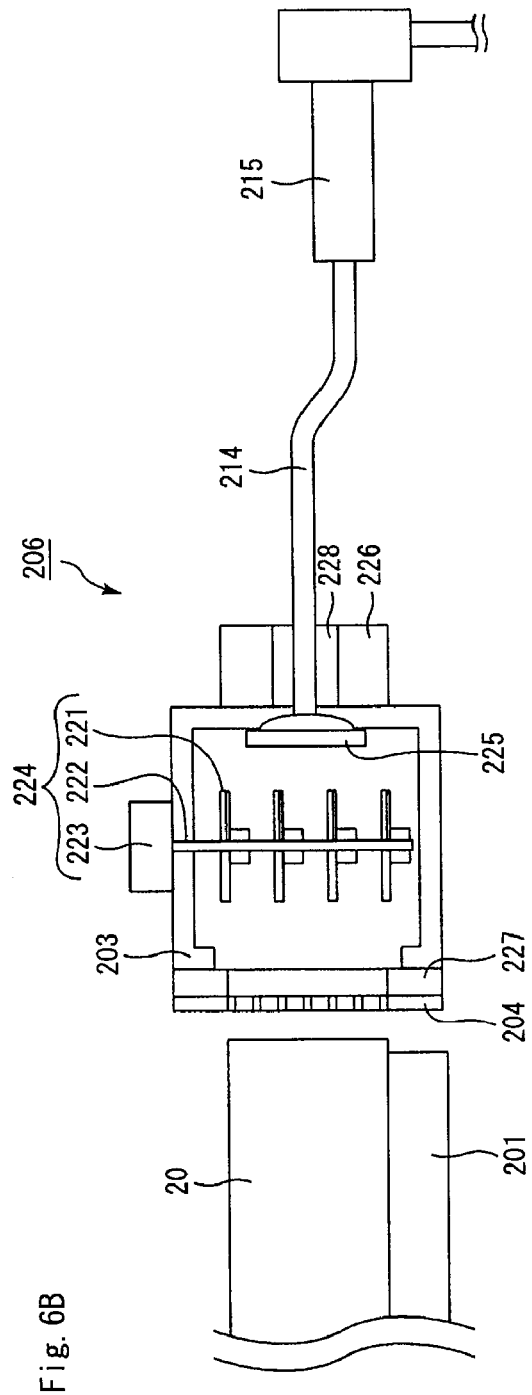
FIG. 6B is a partially enlarged cross-sectional view schematically showing a portion of the honeycomb molded body cell plugging apparatus of FIG. 6A.

FIG. 5 is a conceptual view schematically showing the honeycomb molded body cell plugging apparatus according to the embodiment of the present invention. FIG. 6A is a view schematically showing a paste filling device forming the honeycomb molded body cell plugging apparatus according to the embodiment of the present invention, and FIG. 6B is a partially enlarged cross-sectional view schematically showing a portion of the honeycomb molded body cell plugging apparatus of FIG. 6A.

As shown in FIG. 5, a honeycomb molded body cell plugging apparatus 200 comprises a rotation table 201 configured to rotate with the honeycomb molded body 20 placed thereon, an imaging device 205 configured to capture imagery of the end face of the honeycomb molded body 20, a paste filling portion 206 configured to fill in the end portion of the cells of a honeycomb molded body 20 with the plug material paste including a opening-sealing mask 204, a paste discharging vessel 203 and the like.

The rotation table 201, having a rotary shaft disposed vertically, is configured to rotate horizontally, and includes eight molded body fixation portions 202 for the purpose of fixing the honeycomb molded body 20 in place thereon. The rotation table 201 is configured to rotate intermittently, having the honeycomb molded body 20 fixed thereon by the molded body fixation portions 202, and plugging is conducted to the honeycomb molded body 20 during the time interval in which the rotation table 201 makes a full rotation.

Here, there are eight molded body fixation portions 202 disposed on the rotation table 201, but the number of the molded body fixation portions 202 is not particularly limited to eight.

Also, the two imaging devices 205 are disposed around the rotation table 201 at two sites, and two paste filling devices containing the paste filling portion 206 are also disposed, thereby making it easier to fill in the end portion of cells with paste after capturing images of differing end faces of each of the honeycomb molded bodies 20.

When conducting plugging using this honeycomb molded body cell plugging apparatus 200, first the honeycomb molded body 20 transported by placement on top of a conveyer 199 is fixed to the molded body fixation portions 202 of the rotation table 201 forming the honeycomb molded body cell plugging apparatus 200 by a robot arm (not illustrated).

Next, when the rotation table 201 makes a ⅛ rotation, an end face of the honeycomb molded body 20 stops at a position at which the intended end face of the honeycomb molded body 20 faces the imaging device 205 for the purpose of capturing imagery of the same end face, where imagery of the end face of the honeycomb molded body 20 is then captured by the imaging device 205. The captured image is then immediately analyzed by an image analyzing apparatus (not illustrated) connected to the imaging device 205, and the shape of the cells is extracted from the image, whereby the position of the cells that should be sealed is designated in consideration of the tilt and the like of the honeycomb molded body 20. The position of the openings of the opening-sealing mask 204 used in the plugging is then compared to the designated position, and a position at which the position difference between the openings of the opening-sealing mask 204 and the cells of the honeycomb molded body 20 is the smallest is calculated. Description of this calculation process will be set forth in detail herein after.

Next, the honeycomb molded body 20 of which image capturing has been completed again makes a ⅛ rotation and then stops at the next position. Then, the opening-sealing mask 204 is superimposed over the intended end face of the honeycomb molded body 20 so as to meet the calculated position at which the position difference between the openings of the opening-sealing mask 204 and the cells of the honeycomb molded body 20 is the smallest, whereby plug material paste is filled through the openings of the opening-sealing mask 204, and the intended end face of the honeycomb molded body 20 is sealed. The paste filling portion 206 is fixed by a robot comprising an angle adjustment member configured in such a manner as to set x, y, and z axes to a position determined by its setting.

After this, the rotation table 201 makes a ⅛ rotation, whereby the honeycomb molded body 20 fixed to the molded body fixation portions 202 is lifted up by the robot arm (not illustrated) where it is once again fixed to the molded body fixation portions 202 in such a manner that the sealed end face is turned to the center of the rotation table 201 and the end face yet to be sealed is turned toward the outside.

After this, the rotation table 201 again makes a ⅛ rotation for the purpose of using the imaging device 205 in the same manner as above to capture the image of the end face of the honeycomb molded body 20 that has yet to be sealed. Next, after another ⅛ rotation, the opening-sealing mask 204 is superimposed over the end face of the honeycomb molded body 20 yet to be sealed so as to meet the calculated position at which the position difference between the openings of the opening-sealing mask 204 and the cells of the honeycomb molded body 20 is the smallest, and plugging is then conducted.

After yet another ⅛ rotation to the next position, the sealed honeycomb molded body 20 is then lifted by the not illustrated robot arm and placed on a conveyer 207 for the next process.

In the present specification, the term 'robot arm' refers to an arm comprising active joint having a motor or the like, and according to necessity, further comprising an inactive joint without a motor or the like.

In describing in detail the paste filling device containing the paste filling portion 206, as shown in FIG. 6A, a paste filling device 220 has the paste filling portion 206, and a paste supply portion 218 configured to supply plug material paste to the paste filling portion 206, and both are connected through a plug material paste supply tube 213. Here, the paste filling portion and the paste supply portion may be directly joined instead of being connected through a plug material paste supply tube.

The paste supply portion 218 comprises a paste supply hopper 211 and a paste discharging device 212. In the paste supply portion 218, the plug material paste conveyed from the paste supply hopper 211 which has retained separately prepared plug material paste is sent out by the paste discharging device 212 to the plug material paste supply tube 213, and moreover, sent into the paste filling portion 206.

Also, a filter 216 is interposed in the plug material paste supply tube 213, and even if there are clumps present within the plug material paste, this filter 216 makes it easier to eliminate these clumps.

Also, the size of the openings of the above mentioned filter is not particularly limited, but it is preferable for the size thereof to be at least about 0.1 mm and at most about 1.0 mm.

The paste filling portion 206, as is shown in FIG. 6B, in addition to the opening-sealing mask 204 and the paste discharging vessel 203, also comprises an stirring portion 224 formed by an stirring blade 221, an stirring shaft 222, and a motor 223, a flow regulating plate 225 disposed on the inlet side (the connection point with a plug material paste supply tube 214) of the paste discharging vessel 203, an angle adjustment member 226 and a temperature control member 228 disposed adjacently to one another on the inlet side of the paste discharging vessel 203, a shock absorption member 227 made of silicon rubber and disposed between the opening-sealing mask 204 and the paste discharging vessel 203, a uniaxial eccentric screw pump (monopump) 215, and a plug material paste supply tube 214 configured to join the uniaxial eccentric screw pump 215 with the paste discharging vessel 203.

Then, the plug material paste sent from the paste supply portion 218 is first sent into the uniaxial eccentric screw pump 215, and a fixed amount of the plug material paste is sent from the uniaxial eccentric screw pump 215 through the plug material paste supply tube 214 and the flow regulating plate 225 to the paste discharging vessel 203 where prescribed cells of the honeycomb molded body 20 which are superimposed over the opening-sealing mask 204 through the opening-sealing mask 204 are then filled in.

Also, in the stirring portion 224 disposed in the paste discharging vessel 203, the stirring shaft 22 and the stirring blade 221 are formed so as to rotate. Then, by filling in the plug material paste while rotating the stirring blade 221, it becomes easier to make uniform the temperature of the plug material paste inside the paste discharging vessel 203, which also results in the viscosity of the plug material paste becoming uniform, and because of this, it becomes easier to fill in the plug material paste to the prescribed cells in a uniform manner.

Also, in the paste filling portion 206, the angle adjustment member 226 and the temperature control member 228 are disposed adjacently to one another on the paste discharging vessel 203.

So when superimposing the paste discharging vessel 203 over the target end face of the honeycomb molded body 20, it becomes easier to adjust the opening-sealing mask 204 to be superimposed over the target end face of the honeycomb molded body 20 at a prescribed position according to the angle adjustment member 226.

Also, because a heater is housed inside the temperature control member 228, it becomes easier to control the temperature of the plug material paste to a prescribed temperature according to this temperature control member 228.

Examples of the material of the opening-sealing mask 204 comprise metals such as stainless and nickel, resins such as an epoxy resin, and ceramics and the like.

Also, openings of circular shape or square shape having R-chamfered or C-chamfered angle portions are formed on the opening-sealing mask 204 in correspondence to the cells to be filled with plug material paste.

Here, it is preferable that the surface area of an individual opening of the opening-sealing mask be smaller than the surface area of its corresponding cell. This is because even if the position of the opening of the opening-sealing mask deviates slightly from the position of its corresponding cell, it still remains easier to assuredly fill only in the corresponding cell with the plug material paste and it is easier to prevent the plug material paste from adhering to the end face (end portion of the cell) of the honeycomb molded body. And since the plug material paste has a degree of fluidity, even if the opening of the opening-sealing mask is smaller than the cell opening, it is still easier to assuredly fill in the cell with the plug material.

Also, in the honeycomb molded body cell plugging apparatus 200, the opening-sealing mask 204 is disposed having the shock absorption member 227 made from silicon rubber or the like disposed therein between the opening-sealing mask 204 and the paste discharging vessel 203.

Also, in the honeycomb molded body cell plugging apparatus 200, the flow regulating plate 225 is disposed on the inlet side (the side opposite to the side on which the opening-sealing mask is disposed) of the paste discharging vessel 203.

By disposing the flow regulating plate 225, it becomes easier to make uniform the inflow speed of the plug material paste inside the paste discharging vessel 203 in a central and circumferential portion of the inlet, with the result that in a case of filling in cells with the plug material paste it becomes easier to make uniform the amount of plug material paste with which each cell is filled in.

Figure 7:
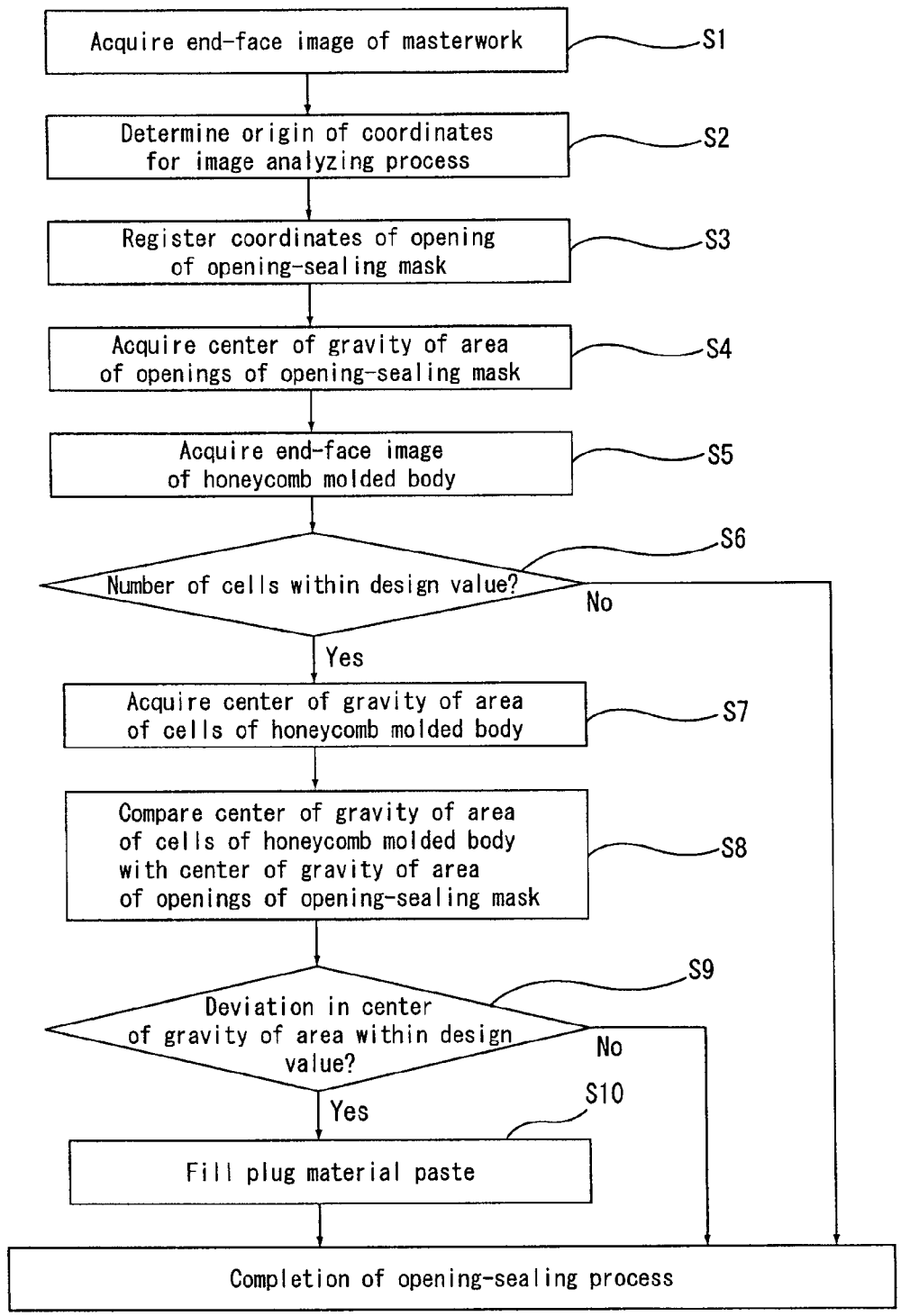
FIG. 7 is a flowchart showing a process (means) from the analysis of the imagery of the end face of the honeycomb molded body according to the embodiment of the present invention to the filling in of the plug material paste.

Next, referring to a flowchart, description will be set forth in regard to a method for analyzing the image attained by the above mentioned image capturing device using an image analyzing device, and a method for filling in cells with plug material paste based on the result of the image analysis. FIG. 7 is a flowchart showing the process (means) from the stage of image analysis of the end face of the honeycomb molded body to the filling of plug material paste.

(a) First, as a reference sample, a masterwork having the same exterior shape as a honeycomb molded body aside from a point of having no cells and a plurality of bottomed holes formed on the end faces is fixed to the molded body fixation portions 202, and an image of the targeted end face of this masterwork having bottomed holes is captured (process S1), and the origin of coordinates is decided by registering coordinates of the formation points of the bottomed holes in the image analyzing device (process S2).

(b) Next, using the origin of coordinates decided in the above mentioned process (a) as a reference, the positions of the openings formed on the opening-sealing mask are then registered in the image analyzing device (process S3).

Further, based on the opening positions registered in the process S3 and the size thereof, the center of gravity of the area of the openings formed on the opening-sealing mask is acquired (process S4).

In the above mentioned image analyzing device the above mentioned processes (a) and (b) are executed before the plug material paste filling.

(c) Next, imagery of the targeted end face of the honeycomb molded body fixed to the molded body fixation portions 202 of the honeycomb molded body cell plugging apparatus 200 and moved following the rotation of the rotation table 201 is captured, and then it is registered in the image analyzing device (process S5).

Then, the captured image of the end face is analyzed in the above mentioned image analyzing device, whereby the number of cells differing in design is calculated. And in a case where the number is greater than a prescribed number, a judgment is made that the honeycomb molded body in question is defective products, and the defective products are separated from good products by judging the other honeycomb molded bodies to be good products (process S6).

Then, the next process S7 is carried out on the honeycomb molded bodies that were judged to be good products. However, regarding the honeycomb molded bodies that were judged to be defective products, the plugging processing is at this point ended without conducting the subsequent plug material paste filling process thereto.

(d) Next, binarization is carried out on the imagery of the end faces of the honeycomb molded bodies that have been judged to good products, and the center of gravity of the area of each cell is acquired based upon the image attained by the binarization (process S7). Now, before and after the above mentioned binarization process, it is acceptable to conduct various kinds of filter processing to the above mentioned image of the end face according to necessity in order to clarify the outline of each cell as much as possible.

(e) Next, the amount of deviation between the center of gravity of the area of the openings of the opening-sealing mask attained in the above mentioned process S4 and the center of gravity of the area of each cell attained in the above mentioned process S7 is calculated using the least square method (process S8).

Here, it is acceptable for the openings and cells which are the subject of calculation of the amount of deviation of the center of gravity of the area of the openings of the opening-sealing mask from the center of gravity of the area of the cells of the honeycomb molded body to be the entire count of the openings and the cells, or to be a only portion of the openings and cells; more specifically, for instance, all openings and cells aside from the two outermost rows of openings and cells.

Then, in a case in which there exists a cell in which the above mentioned amount of deviation exceeds a prescribed value, the honeycomb molded body in question is judged to be defective products, and the defective products are separated from good products by judging the defective products from the good products in such a manner (process S9).

Then, the next process S10 is conducted for the honeycomb molded bodies judged to be good products. However, regarding the honeycomb molded bodies that were judged to be defective products, the plugging process is at this point ended without conducting the subsequent plug material paste filling process thereto.

(f) Next, based upon the amount of deviation from the center of gravity of the area calculated in the above mentioned process of (e), the opening-sealing mask (paste discharging vessel 203) is moved while aligning the position of the opening-sealing mask to thereby superimpose the opening-sealing mask over the targeted end face of the honeycomb molded body, and plug material paste is filled in with the cells (process S10) of the honeycomb molded body from the paste discharging vessel 203, thereby completing the plugging of one end face of the honeycomb molded body.

The position alignment of the opening-sealing mask can be conducted according to the angle adjustment member 226.

Also, here, the position alignment of the opening-sealing mask with the cells is conducted based upon the amount of deviation from the center of gravity of the area calculated in the above mentioned process S8, but for example, in cases in which the amount of deviation of all openings and cells except the two outermost rows of openings and cells only has been calculated, the position alignment with a separate means for the outer two rows may be conducted after the position alignment has been conducted based upon the amount of deviation from the above mentioned center of gravity of the area.

Because the operations of the above mentioned processes of (a) to (f) are operations to be carried out to a single end face of the honeycomb molded body, in cases of filling in both end faces of the honeycomb molded body with plug material paste, the above mentioned processes of (a) to (f) are to be executed repeatedly.

Also, in the honeycomb molded body cell plugging apparatus 200, although the filling of the plug material paste is conducted to the honeycomb molded body which is fixed to the prescribed position of the molded body fixation portions 202 disposed on the rotation table, this fixed position may come to deviate. In such cases in which this fixed position has come to deviate, since there is a risk that even a honeycomb molded body that has been confirmed to be of a prescribed shape in the above mentioned processes S6 and S8 may be judged to be a defective product, an inspection is preferably made as to whether or not the honeycomb molded body is indeed fixed at the prescribed position of the molded body fixation portions 202 before conducting the processes spanning from the analysis of the end face of the honeycomb molded body to the filling of plug material paste.

Moreover, in this case, an inspection may be made every time the honeycomb molded body is fixed, but an inspection is desirably made of one honeycomb molded body per a plurality of honeycomb molded bodies.

In a case of filling of plug material paste with this kind of method, it is preferable that the temperature of the above mentioned plug material paste be at least about 30° C. and at most about 110° C. If the temperature of the plug material paste is about 30° C. or more, it becomes easier to fill in the cells with plug material paste because it becomes difficult for the viscosity of the plug material paste to become high, and alternately, if the temperature of the plug material paste is about 110° C. or less, the filled plug material paste becomes superior in the shape retention, because it becomes difficult for the viscosity of the plug material paste to become low.

It is preferable for the viscosity of the above mentioned plug material paste to be at least about 35 Pa·s and at most about 50 Pa·s (measured temperature: 25° C.). At a viscosity about 35 Pa·s or more, the fluidity of the plug material paste does not become too high, and it becomes easier to plug the cells assuredly because it becomes difficult for the plug material paste to flow in toward the interior portion of the cell of the honeycomb molded body when the plug material paste fills in the cells. Alternately, at a viscosity about 50 Pa·s or less, it becomes difficult for the plug material paste to become clogged in the opening-sealing mask or the filter, and thus it becomes easier to fill in the cells with the plug material paste in an assured manner.

Also, the method for filling in the honeycomb molded body with the plug material paste is not limited to the method for using a honeycomb molded body cell plugging apparatus having the structure described above, and prescribed cells of a honeycomb molded body may be filled in with plug material paste with any other method.

The above mentioned plug material paste is not particularly limited, but a plug material paste with a porosity of at least about 30% and at most about 75% manufactured through the following processes is desirable, such as the same material as the above mentioned wet mixture, for example.

Next, a plug material paste drying process configured to dry the plug material paste with which the cells of the honeycomb molded body are filled in is conducted. Description of the specific method of this plug material paste drying process has already been set forth herein above.

It is also acceptable, in this plug material paste drying process, to preferentially dry the end portion (surface) of the plug material paste layer while drying the honeycomb molded body itself as well.

Next, by carrying out degreasing (at least about 200° C. and at most about 500° C., for example) and firing (at least about 1400° C. and at most about 2300° C., for example) under prescribed conditions to a honeycomb molded body filled in with the above mentioned plug material paste, it is possible to manufacture a honeycomb fired body in which either one of the end portions of each of the above mentioned cells are sealed, and which has a multiplicity of cells disposed in parallel with one another in the longitudinal direction with cell walls therebetween.

The above mentioned conditions under which degreasing and firing are carried out to the above mentioned honeycomb molded body can be the same conditions that have been used conventionally when manufacturing a filter comprising porous ceramic.

Next, a sealing material paste which will become a sealing material layer (adhesive layer) is applied with a uniform thickness to form a sealing material paste layer, and a process for laminating other honeycomb fired bodies onto the sealing material paste layer is successively repeated to manufacture an aggregate of honeycomb fired bodies of a prescribed size.

Moreover, when manufacturing the aggregate of honeycomb fired bodies, the gaps between the honeycomb fired bodies may be collectively filled in with the sealing material paste after a necessary number of honeycomb fired bodies are assembled together through the spacer (gap retention material).

For the sealing material paste described above, one made from an inorganic binder, an organic binder, an inorganic fiber, and/or inorganic particle may be used, for example.

Silica sol, aluminum oxide sol or the like may be used for the inorganic binder mentioned above. These may be used individually or in a combination of two or more. Of the above-mentioned inorganic binders, silica sol is desirable.

It is acceptable to use polyvinyl alcohol, methylcellulose, ethylcellulose, carboxy methylcellulose, and the like, for example, as the above mentioned organic binder. These may be used individually or in a combination of two or more. Of the above mentioned organic binders, carboxy methylcellulose is preferable for use.

It is acceptable to use ceramic fibers such as silica-alumina, mullite, alumina, and silica, and the like, for example, as the above mentioned inorganic fiber. These may be used individually or in a combination of two or more. Of the above mentioned inorganic fiber, alumina fiber is preferable for use.

It is acceptable to use carbide, nitride, and the like. More specifically, it is acceptable to use inorganic powder and the like comprising silicon carbide, silicon nitride, boron nitride, or the like, for example, as the above mentioned inorganic particulate. These may be used individually or in a combination of two or more. Of the above mentioned inorganic particulate, silicon carbide, which excels in its thermal conductivity properties, is preferable for use.

And furthermore, it is also acceptable, according to need, to add a pore-forming agent such as balloon which is a micro hollow sphere having oxide ceramics as a component, spherical acrylic particulate, or graphite and the like, to the above mentioned sealing material paste.

The above mentioned balloon is not particularly limited, as alumina balloons, glass micro balloons, shirasu balloons, fly ash balloons (FA balloons), mullite balloons and the like, for example, are all acceptable for use. Of the above mentioned, alumina balloons are preferable for use.

Next, the honeycomb fired body aggregate is heated to dry and harden the sealing material paste layer, forming a sealing material layer (adhesive layer).

Next, a diamond cutter or the like is used to cut the aggregate of the honeycomb fired bodies, wherein a plurality of honeycomb fired bodies are combined with one another by interposing the sealing material layer, to manufacture a cylindrical ceramic block.

Afterward, a sealing material layer (coat layer) is formed by coating the above mentioned sealing material paste to the outer periphery of the ceramic block, thereby manufacturing a honeycomb structured body having the sealing material layer (coat layer) disposed at the outer periphery of a cylindrical ceramic block on which a plurality of honeycomb fired bodies are combined with one another by interposing the sealing material layer (adhesive layer).

Afterward, a catalyst is supported on the honeycomb structured body as needed. It is also acceptable to support the above mentioned catalyst onto the honeycomb fired bodies before manufacturing the aggregate. In a case where the catalyst is supported, it is preferable that an alumina film with a high specific surface area be formed onto the surface of the honeycomb structured body, and an auxiliary catalyst (promoter) or a catalyst such as platinum be provided on the surface of the alumina film.

As a method for forming the alumina film onto the surface of the above mentioned honeycomb structured body, for example, it is acceptable to apply a method for impregnating the honeycomb structured body with a solution of a metal compound containing aluminum such as $Al(NO_3)_3$ and then heating, or a method for impregnating the honeycomb structured body with a solution containing alumina powder and then heating and other methods.

For providing the alumina film with an auxiliary catalyst, it is acceptable to apply a method for impregnating the honeycomb structured body with a solution of a metal compound containing a rare earth element such as $Ce(NO_3)_3$, for example, and then heating.

For providing the alumina film with a catalyst as described above, it is acceptable to apply a method for impregnating the honeycomb structured body with a dinitrodiammine platinum nitric acid solution ($[Pt(NH_3)_2(NO_2)_2]HNO_3$ with a platinum concentration of about 4.53% by weight) and the like, for example, and then heating.

Also, a catalyst may be provided using a method where alumina particles are provided with a catalyst beforehand, and the honeycomb structured bodies are impregnated with a solution containing the alumina powder having the catalyst, and heating.

The method for manufacturing a honeycomb structured body described up to this point is for a honeycomb structured body having a plurality of honeycomb fired bodies combined with one another by interposing a sealing material layer (adhesive layer) (hereinafter, also termed "aggregated honeycomb structured body"), but the honeycomb structured body manufactured according to the method for manufacturing a honeycomb structured body of the present invention may also be a honeycomb structured body in which a cylindrical ceramic block is made of one honeycomb fired body (hereinafter, also termed "integral honeycomb structured body")

For manufacturing such an integral honeycomb structured body, the honeycomb molded body is manufactured using a method similar to the manufacturing of an aggregated honeycomb structured body, except that the size of the honeycomb molded body formed with extrusion molding in the case of the integral honeycomb structured body is larger than that in the case of the aggregated honeycomb structured body.

Next, according to necessity, in the same manner as in the method for manufacturing an aggregated honeycomb structured body, using a drying apparatus such as a microwave drying apparatus, a hot air drying apparatus, a dielectric drying apparatus, a reduced pressure drying apparatus, a vacuum drying apparatus, and a freeze drying apparatus, the above mentioned honeycomb molded body is dried out. Next, either one of the end portions of each of the cells is filled in with the plug material paste, and the plug material paste drying process is further conducted.

Afterward, in the same manner as in the manufacture of the aggregated honeycomb structured body, degreasing and firing are carried out, thereby manufacturing a ceramic block. And as needed, a sealing material layer (coat layer) is formed, thereby finishing production of the integral honeycomb structured body. It is also acceptable to support a catalyst on the above mentioned integral honeycomb structured body as well, with the method put forth herein above.

In a case of manufacturing a honeycomb structured body with a manufacturing method of the kind described above, the main constituent of the material of the above described aggregated honeycomb structured body preferably comprises silicon carbide or silicon-containing silicon carbide, and the main constituent of the material of the above described integral honeycomb structured body preferably comprises cordierite or aluminum titanate.

EXAMPLES

Herein below examples will be set forth describing the present invention in further detail, though the present invention is not limited to these examples.

Example 1

(1) 250 kg of α-type silicon carbide powder having a mean particle diameter of 10 μm, 100 kg of α-type silicon carbide powder having a mean particle diameter of 0.5 μm, and 20 kg of organic binder (methylcellulose) were mixed together to prepare a powder mixture.

Next, 12 kg of a lubricating agent (UNILUBE, manufactured by NOF Corp.), 5 kg of a plasticizer (glycerin), and 65 kg of water were mixed to separately prepare a liquid mixture. Next, using a wet mixer machine, the liquid mixture and the powder mixture were mixed together, thereby preparing the wet mixture.

Next, extrusion molding using the wet mixture followed by cutting was then carried out to produce honeycomb molded bodies. After that, the above mentioned honeycomb molded body was dried using a microwave drying apparatus.

(2) Next, using a honeycomb molded body cell plugging apparatus having the structure shown in FIGS. 5, 6A, and 6B, prescribed cells were filled in with a plug material paste having a composition same as that of the above mentioned honeycomb molded body. Here, the specifications of the constituent members of the honeycomb molded body cell plugging apparatus are as follows.

Temperature of Plug Material Paste - - - 70° C. (in the paste discharging vessel)

Viscosity of Plug Material Paste - - - 42 Pa·s (measured temperature of 25° C. at the time of preparation)

Uniaxial Eccentric Screw Pump - - - 'Robo-Dispenser 3NDPL06G15' Manufactured by HEISHIN Ltd.

Discharge Time of Plug Material Paste - - - 1.6 sec

Fill-in Amount of Plug Material Paste - - - 3 g/face (3) Next, the honeycomb molded body which has been filled in with the plug material paste was carried into the hot air drying apparatus 110 shown in FIGS. 2-2A and 2-2B comprising the drying oven having the drying portion 103$a$ and the cooling portion 103$b$, where the plug material paste layer is dried by blowing hot air to the end faces of the honeycomb molded body, and afterward, the plug material paste layer was cooled. The specifications of the hot air drying apparatus are as follows.

Length of Drying Portion - - - 1.9 m

Length of Cooling Portion - - - 0.7 m

Temperature of Hot Air - - - 190° C.

Speed of Hot Air Wind - - - 13 m/sec
Blowing Time of Hot Air - - - 2.7 min.
Temperature of Cool Air - - - 25° C.

The period of time over which the above mentioned hot air is blown is adjusted according to the movement speed of the belt conveyer moving continuously at a constant speed, and the movement speed of the belt conveyer is 0.7 m/min.

(4) Next, after degreasing the honeycomb molded body with a plug material paste layer formed thereon at 400° C., firing was carried out for three hours at atmospheric pressure in an argon atmosphere at 2200° C., thereby manufacturing a honeycomb fired body such as the one shown in FIGS. 4A and 4B made of a silicon carbide fired body having a porosity of 40%, a mean pore diameter of 12.5 μm, a size of 34.3 mm×34.3 mm×150 mm, with the number of cells (cell concentration) of 49 pcs/cm$^2$, and a cell wall thickness of 0.25 mm.

Examples 2 to 8, Reference Examples 1 to 4

Aside from the point of having changed the temperature of the hot air and the time period over which the hot air is blown in the process (3) of Example 1 to the values indicated in Table 1, the honeycomb fired body was manufactured in the same manner as in Example 1.

Example 9

Aside from the point of having changed the method by which hot air was blown to the end face of the honeycomb molded body in the process (3) of Example 1 to the following method, the honeycomb fired body was manufactured in the same manner as in Example 1.

Specifically, the plug material paste was dried by first blowing hot air from only the hot air blow ports on one side of the belt conveyer and also on ½ of the interior portion of the drying oven running from the inlet side, out of all of the hot air blow ports provided on both sides of the belt conveyer, and then blowing hot air from only the hot air blow ports on the side of the belt conveyer opposite to the hot air blow ports that blew hot air on the inlet side and also on ½ of the interior portion of the drying oven running from the outlet side.

Therefore, in the present example, hot air is blown to each of the end faces of the honeycomb molded body in turn.

Example 10

Aside from the point of not having dried the honeycomb molded body with a microwave drying apparatus in the process (1) of Example 1 after manufacturing the honeycomb molded body by extrusion molding the wet mixture and subsequently performing cutting, the honeycomb fired body was manufactured in the same manner as in Example 1.

Comparative Example 1

Aside from the point of having blown cooled air of a temperature of 25° C. to the end faces of the honeycomb molded body in place of the hot air in the process (3) of Example 1, the honeycomb fired body was manufactured in the same manner as in Example 1.

Comparative Example 2

Aside from the point of having blown air of a temperature of 60° C. to the end faces of the honeycomb molded body in place of the hot air in the process (3) of Example 1, the honeycomb fired body was manufactured in the same manner as in Example 1.

Comparative Example 3

Aside from the point of not having conducted the process (3) of Example 1, the honeycomb fired body was manufactured in the same manner as in Example 1.

(Evaluation of the Honeycomb Fired Body)

The manufactured honeycomb fired bodies were cut in such a manner as to intersect the cells in a direction parallel to the longitudinal direction of the honeycomb fired body. Visual observation was then conducted to the plug material layer on the cut face enlarged five times by a magnifier.

The results of observation are displayed in Table 1.

TABLE 1

| | Temp of Hot Air (° C.) | Speed of Hot Air (m/sec) | Length of Drying Portion (m) | Movement Speed of Conveyer (m/min) | Blow Time Period of Hot Air (min) | Shape of Plug Material Layer |
|---|---|---|---|---|---|---|
| Example 1 | 190 | 13 | 1.9 | 0.7 | 2.7 | Good |
| Example 2 | 140 | 13 | 1.9 | 0.7 | 2.7 | Good |
| Example 3 | 130 | 13 | 1.9 | 0.7 | 2.7 | Good |
| Example 4 | 200 | 13 | 1.9 | 0.7 | 2.7 | Good |
| Example 5 | 210 | 13 | 1.9 | 0.7 | 2.7 | Good |
| Example 6 | 190 | 13 | 1.9 | 0.95 | 2.0 | Good |
| Example 7 | 190 | 13 | 1.9 | 0.5 | 3.8 | Good |
| Example 8 | 190 | 13 | 1.9 | 0.27 | 7.0 | Good |
| Example 9[*1] | 190 | 13 | 1.9 | 0.35 | 2.7 | Good overall, but some shrinkage was observed on a portion on the side to which hot air was blown in the last half |
| Example 10[*2] | 190 | 13 | 1.9 | 0.7 | 2.7 | Good, but some warpage occurred in the honeycomb molded body after the hot air drying process |
| Reference Example 1 | 220 | 13 | 1.9 | 0.7 | 2.7 | shrinkage observed on surface |
| Reference Example 2 | 190 | 13 | 1.9 | 1.9 | 1.0 | shrinkage observed on surface |
| Reference Example 3 | 190 | 13 | 1.9 | 0.24 | 7.9 | shrinkage observed on surface |
| Reference Example 4 | 120 | 13 | 1.9 | 0.7 | 2.7 | shrinkage observed on surface |
| Comparative Example 1[*3] | 25 | 13 | 1.9 | 0.7 | 2.7 | surface shrinkage, as well as unsealed cells observed |
| Comparative Example 2[*3] | 60 | 13 | 1.9 | 0.7 | 2.7 | surface shrinkage, as well as unsealed cells observed |

TABLE 1-continued

| | Temp of Hot Air (° C.) | Speed of Hot Air (m/sec) | Length of Drying Portion (m) | Movement Speed of Conveyer (m/min) | Blow Time Period of Hot Air (min) | Shape of Plug Material Layer |
|---|---|---|---|---|---|---|
| Comparative Example 3 | — | — | — | — | — | surface shrinkage, as well as unsealed cells observed |

*[1]In Example 9, hot air was blown to each face of the honeycomb molded body alternately.
*[2]In Example 10, microwave drying was not conducted before the filling of the plug material paste.
*[3]In Comparative Examples 1 and 2, cool air or air of a low temperature was blown in place of the hot air.

As can be clearly seen from Table 1, in the honeycomb fired bodies according to Examples 1 to 8, the shape of the plug material layer was good as there was virtually no formation of recesses (shrinkage) thereon.

In the honeycomb fired body according to Example 9, while the shape of the plug material layer was good for the most part, recesses (shrinkage) did form on a portion of the plug material layer on the side blown with hot air in the last half. This is presumably because it took extra time to dry the side blown with hot air in the last half. This showed that when conducting the blowing of hot air, it is preferable to blow the hot air to both sides simultaneously.

In the honeycomb fired body according to Example 10, the shape of the plug material layer was good. However, there did occur a slight amount of war page in the honeycomb fired body of this example. This is presumably because drying was not carried out before the filling of the plug material paste.

In the honeycomb fired bodies according to Reference Examples 1 to 4, recesses (shrinkage) did form on the surface of the plug material layer. However, these recesses (shrinkage) did not increase in size to result in the occurrence of unsealed cells. Therefore, it can be said for the time being that the object of the filling of the plug material paste was achieved in Reference Examples 1 to 4.

Also, in Reference Examples 1 and 3, portions near the end face of the honeycomb molded bodies had become brittle, and easily incurred damages even with light tapping (tapping was conducted at a force that would not cause damage if tapped near the central portion of the honeycomb molded body) using a metal rod. This presumably leads to an assumption that degreasing will progress excessively near portions of the end face that have been blown with hot air in a focused manner, whereby the portions will become brittle.

In the honeycomb fired bodies according to the Comparative Examples 1 to 3, recesses (shrinkage) did form on the surface of the plug material layer, and further in the honeycomb fired bodies according to Comparative Examples 1 to 3, these recesses (shrinkage) did increase in size and did indeed result in the occurrence of unsealed cells on a portion of the plug material layer. This is presumably because the temperature of the air blown to the plug material paste layer has been too low, or because hot air has not been blown thereto.

What is claimed as new and desired to be secured by Letters Patent of the United States is:

1. A method for manufacturing a honeycomb structured body comprising:
    molding ceramic raw material to form a pillar-shaped honeycomb molded body having a multiplicity of cells disposed in parallel with one another in the longitudinal direction with a cell wall therebetween,
    filling in either one of the end portions of each of said cells with a plug material paste,
    drying a plug material paste layer by simultaneously blowing hot air onto both end faces of said honeycomb molded body from a plurality of hot air blow ports of a hot air drying apparatus, wherein the hot air drying apparatus comprises, inside a drying oven, said hot air blow ports positioned on opposite sides of said honeycomb molded body and disposed at locations facing an end face of said honeycomb molded body in order to preferentially dry both end portions of the plug material paste layer, and
    firing this honeycomb molded body to manufacture a honeycomb structured body comprising a honeycomb fired body.

2. The method for manufacturing a honeycomb structured body according to claim 1, wherein in said plug material paste drying process, hot air at a temperature of at least about 130° C. and at most about 210° C. is blown to an end face of said honeycomb molded body for a time period of at least about 2 minutes and at most about 7 minutes.

3. The method for manufacturing a honeycomb structured body according to claim 1, wherein said hot air drying apparatus further comprises, inside said drying oven, a transport member for transporting said honeycomb molded body.

4. The method for manufacturing a honeycomb structured body according to claim 3, wherein said plurality of hot air blow ports are disposed inside said drying oven in parallel with one another, over approximately the entire range from an inlet side to an outlet side of the drying oven.

5. The method for manufacturing a honeycomb structured body according to claim 3, wherein said plurality of hot air blow ports are disposed in such a manner that adjacent hot air blow ports are disposed with intervals therebetween.

6. The method for manufacturing a honeycomb structured body according to claim 3, wherein the wind speed at which said hot air is blown is at least about 10 m/sec and at most about 30 m/sec.

7. The method for manufacturing a honeycomb structured body according to claim 3, wherein
    said hot air drying apparatus further comprises, inside said drying oven, a cooling portion equipped with a cold air blow port, and
    said cold air blow port blows cold air after said hot air blow port blows hot air to said honeycomb molded body.

8. The method for manufacturing a honeycomb structured body according to claim 7, wherein
    said cooling portion is disposed at the outlet side of the drying oven, and
    a plurality of said cold air blow ports are disposed in parallel with one another, over approximately the entire range from an inlet side to an outlet side of said cooling portion.

9. The method for manufacturing a honeycomb structured body according to claim 7, wherein a plurality of said cold air blow ports are disposed in such a manner that adjacent cold air blow ports are disposed with intervals therebetween.

10. The method for manufacturing a honeycomb structured body according to claim 3, wherein said transport member moves at a constant speed or a varying speed, in a continuous manner or an intermittent manner.

11. The method for manufacturing a honeycomb structured body according to claim 10, wherein said honeycomb molded body is placed on said transport member in a manner in which the longitudinal direction of said honeycomb molded body faces the direction perpendicular to the direction of movement.

12. The method for manufacturing a honeycomb structured body according to claim 10, wherein said transport member is any one of a belt conveyer, a chain conveyer, a roller conveyer and a pallet conveyer.

13. The method for manufacturing a honeycomb structured body according to claim 10, wherein
said transport member is a belt conveyer,
a movement speed of said belt conveyer is at least about 0.4 m/min and at most about 1.0 m/min.

14. The method for manufacturing a honeycomb structured body according to claim 1, wherein said honeycomb structured body has a structure comprising a plurality of honeycomb fired bodies bonded to one another through sealing material layers.

15. The method for manufacturing a honeycomb structured body according to claim 1, wherein said honeycomb structured body is formed by a single piece of said honeycomb fired body.

16. The method for manufacturing a honeycomb structured body according to claim 1, wherein said plug material paste is filled by using a honeycomb molded body cell plugging apparatus that comprises:
an imaging device configured to capture imagery of the end face of said honeycomb molded body; and
a paste filling portion configured to fill in either one of the end portions of each of said cells with the plug material paste.

17. The method for manufacturing a honeycomb structured body according to claim 16, wherein said honeycomb molded body cell plugging apparatus further comprises:
a rotation table configured to rotate with said honeycomb molded body placed thereon;
an opening-sealing mask; and
a paste discharging vessel.

18. The method for manufacturing a honeycomb structured body according to claim 1, wherein said plug material paste has a viscosity of at least about 35 Pa·s and at most about 50 Pa·s at 25° C.

* * * * *